(12) United States Patent
Stepp et al.

(10) Patent No.: US 9,638,605 B2
(45) Date of Patent: May 2, 2017

(54) ADAPTER ASSEMBLIES INCLUDING ENGAGEMENT ASSEMBLIES

(71) Applicant: Toyota Motor Engineering & Manufacturing North America, Inc., Erlanger, KY (US)

(72) Inventors: Larry Keith Stepp, Culloden, WV (US); Warren Edmond Smith, Hurricane, WV (US); Joe Allen Cook, Gallipolis, OH (US); Christopher Scott Rutan, Buffalo, WV (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 110 days.

(21) Appl. No.: 14/813,587

(22) Filed: Jul. 30, 2015

(65) Prior Publication Data
US 2017/0030805 A1 Feb. 2, 2017

(51) Int. Cl.
*G01M 15/00* (2006.01)
*G01M 15/02* (2006.01)

(52) U.S. Cl.
CPC .................................. *G01M 15/02* (2013.01)

(58) Field of Classification Search
CPC .... G01M 15/02; G01M 13/025; G01M 15/00; F16M 11/28; F16M 11/42; F16M 2200/028; F16M 2200/066; F16M 3/00; F16M 7/00; Y10S 73/02; F16D 1/00; F16D 1/033; F16D 1/101; F16D 21/06; F16D 13/70; F16D 13/71; F16D 1/076;
F16D 1/108; F16D 2013/706; F16D 2021/0607; F16D 2021/0615; F16D 2021/0669; F16D 2021/0684; F16D 2300/12
(Continued)

(56) References Cited

U.S. PATENT DOCUMENTS 3,722,808 A * 3/1973 Brown ................. B65H 54/543
                                                    242/573
4,195,494 A * 4/1980 Kinney ..................... G01L 3/18
                                                    464/158
(Continued)

FOREIGN PATENT DOCUMENTS

| DE | 3519660 | 12/1986 |
| DE | 102013017025 | 8/2014 |
| GB | 1482610 | 8/1977 |

*Primary Examiner* — Freddie Kirkland, III
(74) *Attorney, Agent, or Firm* — Dinsmore & Shohl LLP (57) ABSTRACT

An adapter assembly for testing an engine includes an adapter plate including an engagement face, an engagement assembly positioned at least partially within the adapter plate, where at least a portion of the engagement assembly extends outward from the adapter plate in an axial direction, the engagement assembly including a through member extending in the axial direction through the engagement assembly, a mandrel assembly positioned at least partially within the adapter plate and extending in the axial direction, and an expandable claw assembly engaged with the mandrel assembly, where the expandable claw assembly is repositionable between an engaged position, in which the expandable claw assembly has an engaged diameter, and a disengaged position, in which the expandable claw assembly has a disengaged diameter that is less than the engaged diameter.

20 Claims, 6 Drawing Sheets

(58) Field of Classification Search
USPC .................................................. 73/116.02
See application file for complete search history.

(56) References Cited

U.S. PATENT DOCUMENTS

| | | | | |
|---|---|---|---|---|
| RE30,381 E | * | 8/1980 | Ries | B61C 9/44 |
| | | | | 105/117 |
| 4,405,038 A | * | 9/1983 | Ternehall | B60K 25/02 |
| | | | | 192/216 |
| 4,881,922 A | * | 11/1989 | Ayers | F16D 1/00 |
| | | | | 29/25.01 |
| 5,137,495 A | * | 8/1992 | Luebke | B41F 13/0008 |
| | | | | 403/261 |
| 6,802,207 B2 | * | 10/2004 | Okuda | G01M 15/044 |
| | | | | 73/114.01 |
| 6,830,140 B2 | * | 12/2004 | Zink | F16D 13/70 |
| | | | | 192/110 B |
| 7,837,564 B2 | * | 11/2010 | Farahati | F16D 1/076 |
| | | | | 192/70.18 |
| 7,980,123 B2 | * | 7/2011 | Ussery | F16D 3/68 |
| | | | | 73/115.01 |
| 8,413,780 B2 | * | 4/2013 | Yildiz | F16D 1/101 |
| | | | | 192/48.603 |
| 8,418,540 B2 | * | 4/2013 | Schrotter | G01M 15/044 |
| | | | | 73/116.02 |
| 8,770,062 B2 | * | 7/2014 | Kobayashi | F16C 3/12 |
| | | | | 74/603 |
| 9,360,097 B2 | * | 6/2016 | Burky, Jr. | F16D 1/101 |
| 2003/0164029 A1 | * | 9/2003 | Okuda | G01M 15/044 |
| | | | | 73/116.02 |

* cited by examiner

ADAPTER ASSEMBLIES INCLUDING ENGAGEMENT ASSEMBLIES

TECHNICAL FIELD

The present specification generally relates to adapter assemblies including engagement assemblies for testing internal combustion engines, and more specifically, adapter assemblies that may be severally coupled to an internal combustion engine to perform a cold test of the engine.

BACKGROUND

Engines, such as internal combustion engines may be subjected to various tests and quality verifications, such as leak tests, hot tests, and cold tests as part of the manufacturing process. In one example, an internal combustion engine may be subjected to a cold test, in which the engine is severally coupled to a testing machine that rotates the crankshaft of the engine and detects various responses of the engine to the crankshaft rotation. An adapter assembly including one or more engagement assemblies may be used to couple the engine to the testing machine and may simulate a torque converter coupled to the engine. The adapter assemblies may be re-used on multiple engines and, and the engagement assemblies of the adapter assemblies may undergo multiple cycles of being coupled to and de-coupled from internal combustion engines. Over multiple cycles, the engagement assemblies and other components of the adapter assemblies may fatigue and fail, which may result in process downtime and scrapped parts, thereby increasing manufacturing costs.

Accordingly, alternative adapter assemblies including engagement assemblies are desired.

SUMMARY

In one embodiment, an adapter assembly for testing an engine includes an adapter plate including an engagement face, an engagement assembly positioned at least partially within the adapter plate, where at least a portion of the engagement assembly extends outward from the adapter plate in an axial direction, the engagement assembly including a through member extending in the axial direction through the engagement assembly, a mandrel assembly positioned at least partially within the adapter plate and extending in the axial direction, and an expandable claw assembly engaged with the mandrel assembly, where the expandable claw assembly is repositionable between an engaged position, in which the expandable claw assembly has an engaged diameter, and a disengaged position, in which the expandable claw assembly has a disengaged diameter that is less than the engaged diameter.

In another embodiment, an adapter assembly for testing an engine includes an adapter plate including an engagement face, a housing coupled to the adapter plate, an engagement assembly positioned at least partially within the adapter plate, where at least a portion of the engagement assembly extends outward from the adapter plate in an axial direction, the engagement assembly including a through member extending in the axial direction through the engagement assembly, a mandrel assembly positioned at least partially within the adapter plate and extending in the axial direction, an expandable claw assembly including a plurality of leaves engaged with the mandrel assembly, and a handle bar coupled to the through member.

In yet another embodiment, a method for severally coupling an adapter assembly to an engine includes positioning the adapter assembly on a drive plate of the engine, positioning at least a portion of an engagement assembly of the adapter assembly within an aperture of the drive plate of the engine, drawing a through member that extends through the engagement assembly in an axial direction, thereby repositioning an expandable claw assembly from a disengaged position to an engaged position, and engaging the aperture of the drive plate with the expandable claw assembly, thereby severally coupling the adapter assembly to the drive plate of the engine.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Adapter assemblies according to the present specification include an adapter plate including an engagement face, and an engagement assembly positioned at least partially within the adapter plate, where at least a portion of the engagement assembly extends outward from the adapter plate in an axial direction. The engagement assembly includes a through member extending in the axial direction through the engagement assembly, and a mandrel assembly positioned at least partially within the adapter plate and extending in the axial direction. The engagement assembly further includes an expandable claw assembly engaged with the mandrel assembly, where the expandable claw assembly is repositionable between an engaged position, in which the expandable claw assembly has an engaged diameter, and a disengaged position, in which the expandable claw assembly has a disengaged diameter that is less than the engaged diameter. In embodiments, the through member may draw the mandrel assembly in the axial direction to reposition the expandable claw assembly between the engaged position and the disengaged position. By repositioning the expandable claw assembly between the engaged position and the disengaged position, the adapter assembly may be severally coupled to a drive plate of an engine to test the engine, and the adapter assembly may be removed from the engine subsequent to the test. These and other embodiments will be described in more detail below in reference to the appended drawings.

As used herein, the term "axial direction" refers to the direction extending along an axis of the adapter assembly that is co-linear with a central axis of the adapter assembly (i.e., in the +/−X-direction as depicted). The term "radial direction" refers to the direction extending along a radius of the adapter assembly (i.e., in the +/−Y-direction as depicted), and is transverse to the axial direction.

Figure 1:
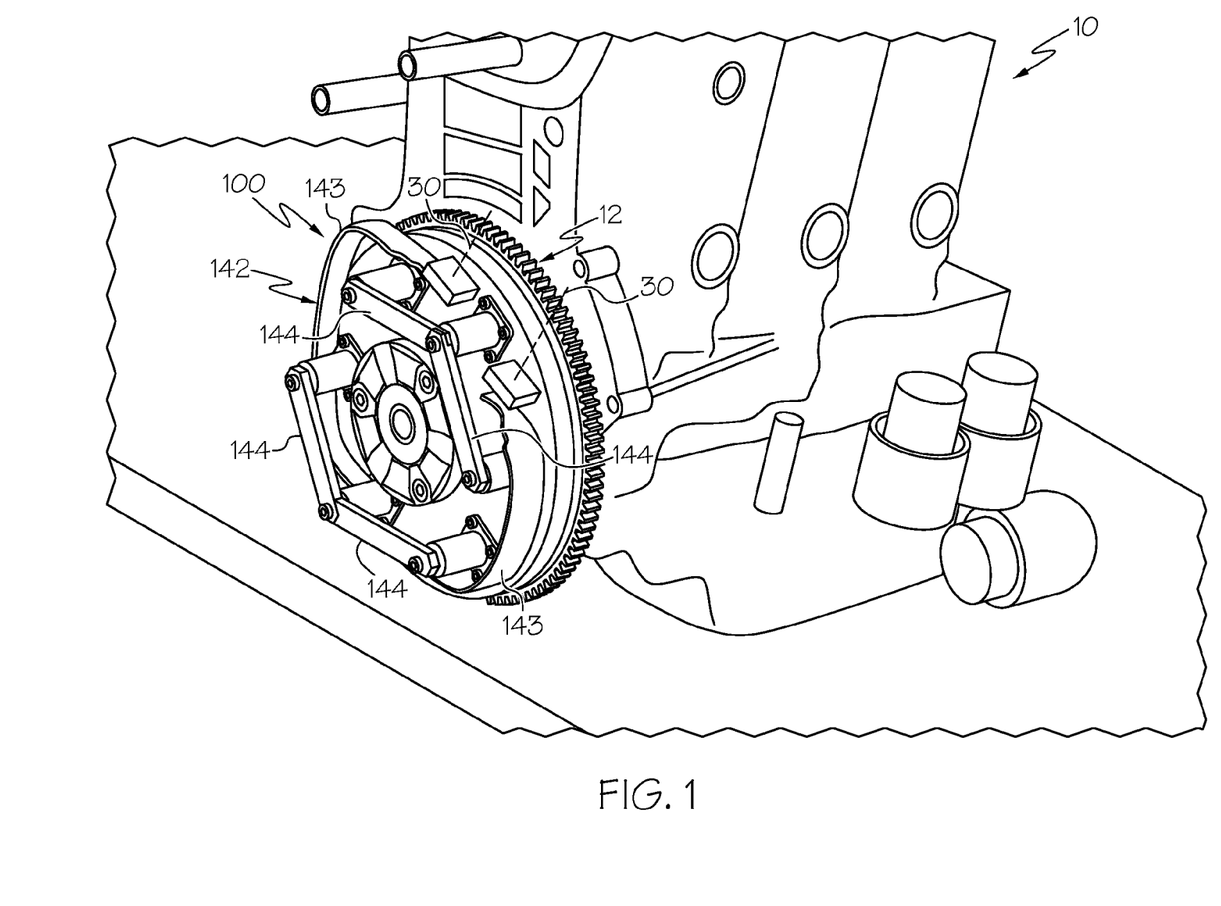
FIG. 1 schematically depicts an internal combustion engine and an adapter assembly severally coupled to a drive plate of the internal combustion engine according to one or more embodiments shown or described herein.

Referring initially to FIG. 1, an internal combustion engine 10 is depicted. The engine 10 includes a drive plate 12 that is coupled to a crankshaft (not depicted) of the engine 10. When the engine 10 is installed to a vehicle, the drive plate 12 couples the engine 10 to other components of the vehicle's drivetrain, such as a transmission.

In the embodiment depicted in FIG. 1, an adapter assembly 100 is severally coupled to the drive plate 12 of the engine 10. The adapter assembly 100 may be used to couple the engine 10 to a testing machine (not depicted) that is used to subject the engine 10 to a "cold test." In a "cold test," the testing machine rotates the drive plate 12 of the engine 10 and detects the response of the engine 10 to rotation of the crankshaft. In embodiments, the adapter assembly 100 simulates the response of a torque converter to rotation of the crankshaft and the adapter assembly 100 may couple the testing machine to the drive plate 12 of the engine 10.

Figure 2:
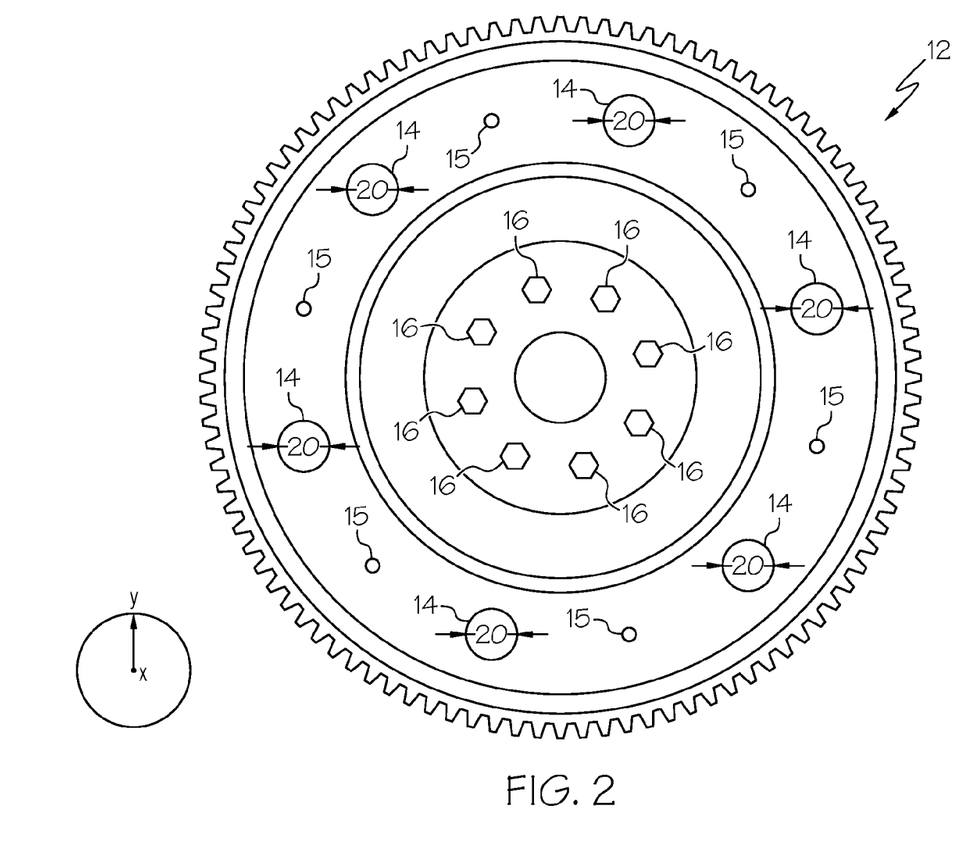
FIG. 2 schematically depicts the drive plate of the internal combustion engine of FIG. 1 according to one or more embodiments shown or described herein.

Referring to FIG. 2, the drive plate 12 of the engine 10 is depicted in isolation. A plurality of fasteners 16 couple the drive plate 12 to the crankshaft of the engine 10 (FIG. 1). The drive plate 12 defines a plurality of apertures 14 and holes 15 that are radially positioned around the drive plate 12. The apertures 14 and the holes 15 of the drive plate 12 may be utilized to couple components of a vehicle's drivetrain to the drive plate 12, and are also used to couple the adapter assembly 100 to the drive plate 12, as will be described in greater detail herein.

Figure 3:
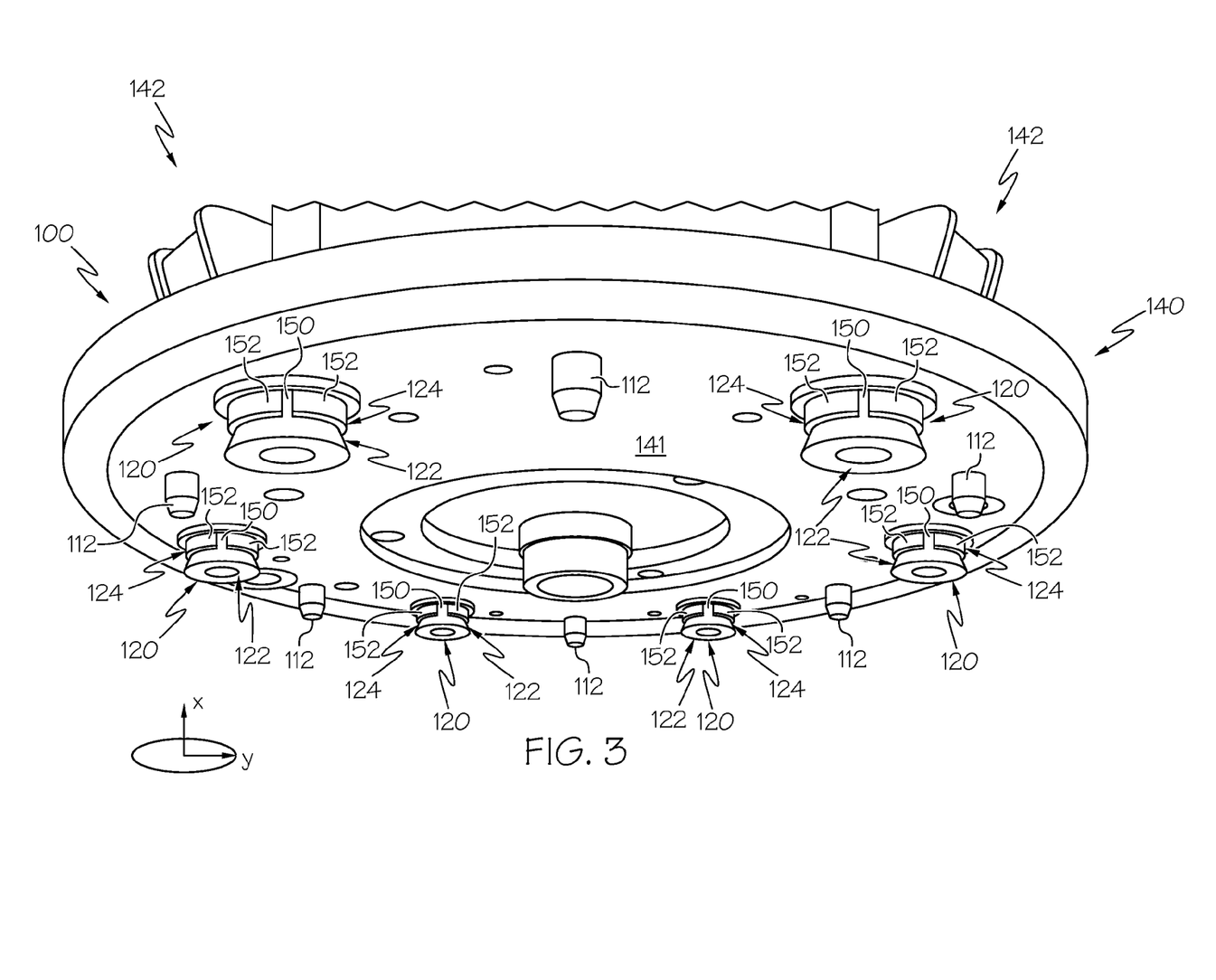
FIG. 3 schematically depicts a perspective view of the adapter assembly of FIG. 1 according to one or more embodiments shown or described herein.

Referring collectively to FIGS. 2 and 3, the adapter assembly 100 includes an adapter plate 140 that includes an engagement face 141. When the adapter assembly 100 is severally coupled to the engine 10 (FIG. 1), the engagement face 141 is oriented to face the drive plate 12. The adapter assembly 100 includes a plurality of engagement assemblies 120 that are radially positioned around the adapter assembly 100. At least a portion of each of the engagement assemblies 120 extends outward from the engagement face 141 of the adapter assembly 100 in the axial direction. The engagement assemblies 120 are positioned to engage the apertures 14 of the drive plate 12 such that when the adapter assembly 100 is coupled to the drive plate 12, each of the engagement assemblies 120 are positioned at least partially within the apertures 14.

Each of the engagement assemblies 120 include expandable claw assemblies 124 positioned around a circumference of each of the engagement assemblies 120. Each of the expandable claw assemblies 124 include one or more leaves 152 that extend around each of the circumferences of the expandable claw assemblies 124, the leaves 152 defining a gap 150 or gaps positioned between individual ones of the leaves 152. Each of the leaves 152 may selectively move toward or away from one another, thereby increasing or decreasing a dimension of the gap 150 between the individual leaves 152 and increasing or decreasing the diameter of each of the expandable claw assemblies 124. In particular, the leaves 152, and accordingly the expandable claw assemblies 124 may be selectively moved between an engaged position having an engaged diameter and a disengaged position having a disengaged diameter that is less than the engaged diameter. In embodiments, each of the expandable claw assemblies 124 are positioned around an increasing circumference of mandrel assemblies 122, and the mandrel assemblies 122 selectively move the leaves 152 toward or away from one another using the increasing circumference, thereby moving the leaves 152 between the engaged position and the disengaged position, as will be described in greater detail herein.

The adapter assembly 100 includes a guide pin and/or a plurality of guide pins 112 that are radially positioned around the engagement face 141 of the adapter assembly 100. The guide pins 112 extend outward from the engagement face 141 in the axial direction and are radially positioned to engage the holes 15 of the drive plate 12. When the adapter assembly 100 is severally coupled to the engine 10 (FIG. 1), the guide pins 112 are positioned at least partially within the holes 15 of the drive plate 12, and accordingly, the guide pins 112 may assist in aligning the engagement assemblies 120 with the apertures 14 of the drive plate 12.

Figure 4:
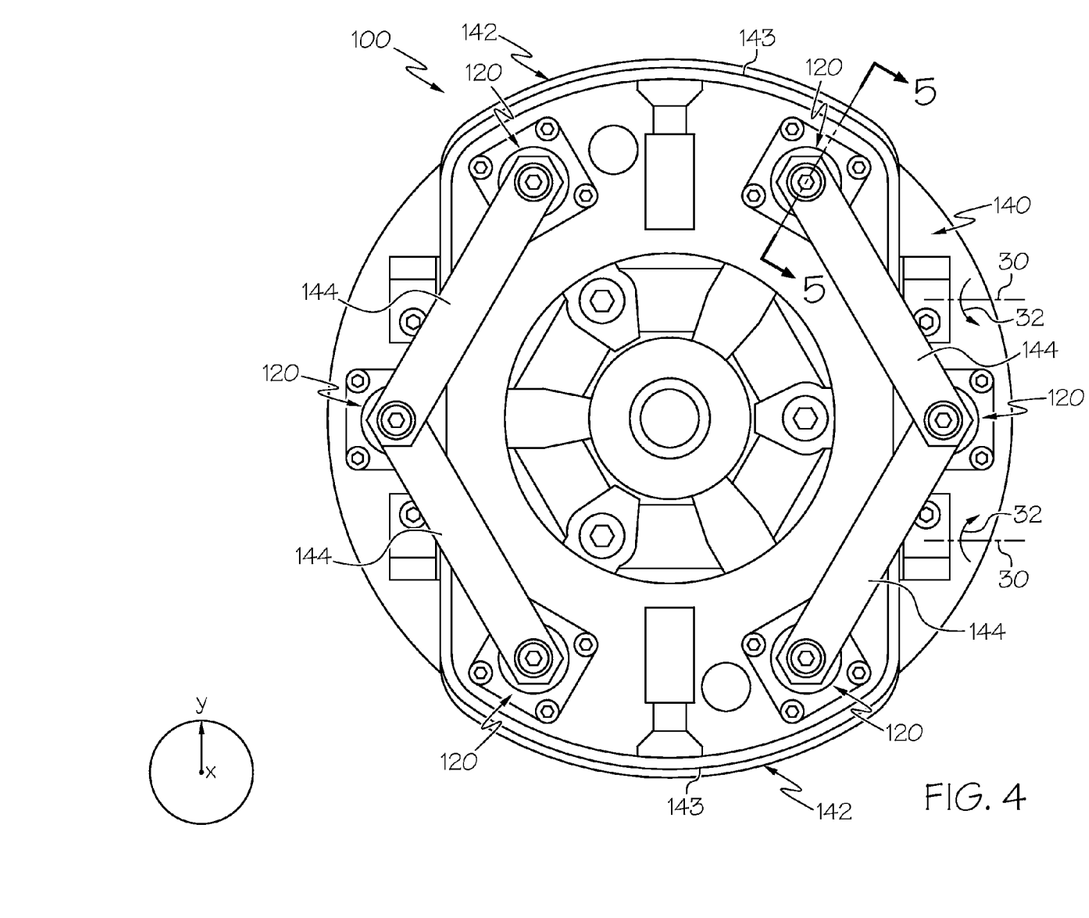
FIG. 4 schematically depicts a rear view of an adapter plate of the adapter assembly of FIG. 3 according to one or more embodiments shown or described herein.

Referring collectively to FIGS. 1 and 4, the adapter assembly 100 includes a handle assembly 142 including one or more handles 143 and one or more handle bars 144. Each of the handles 143 are pivotally coupled to the adapter plate 140 and each of the handle bars 144 are coupled to and extend between ones of the engagement assemblies 120. In particular, each of the handles 143 are pivotally coupled to the adapter plate 140 such that the each of the handles 143 pivot about an axis 30. When each of the handles 143 pivot about the axis 30 in direction 32, each of the handles 143 contact and engage ones of the handle bars 144. As each of the handles 143 engage the handle bars 144, the handles 143 draw each of the handle bars 144 outward and away from the adapter plate 140 in the axial direction. By drawing the handle bars 144 outward and away from the adapter plate 140, the handle assembly 142 repositions the expandable claw assemblies 124 (FIG. 3), and accordingly the engagement assemblies 120 between an engaged position and a disengaged position, as will be described in greater detail herein.

Figure 5:
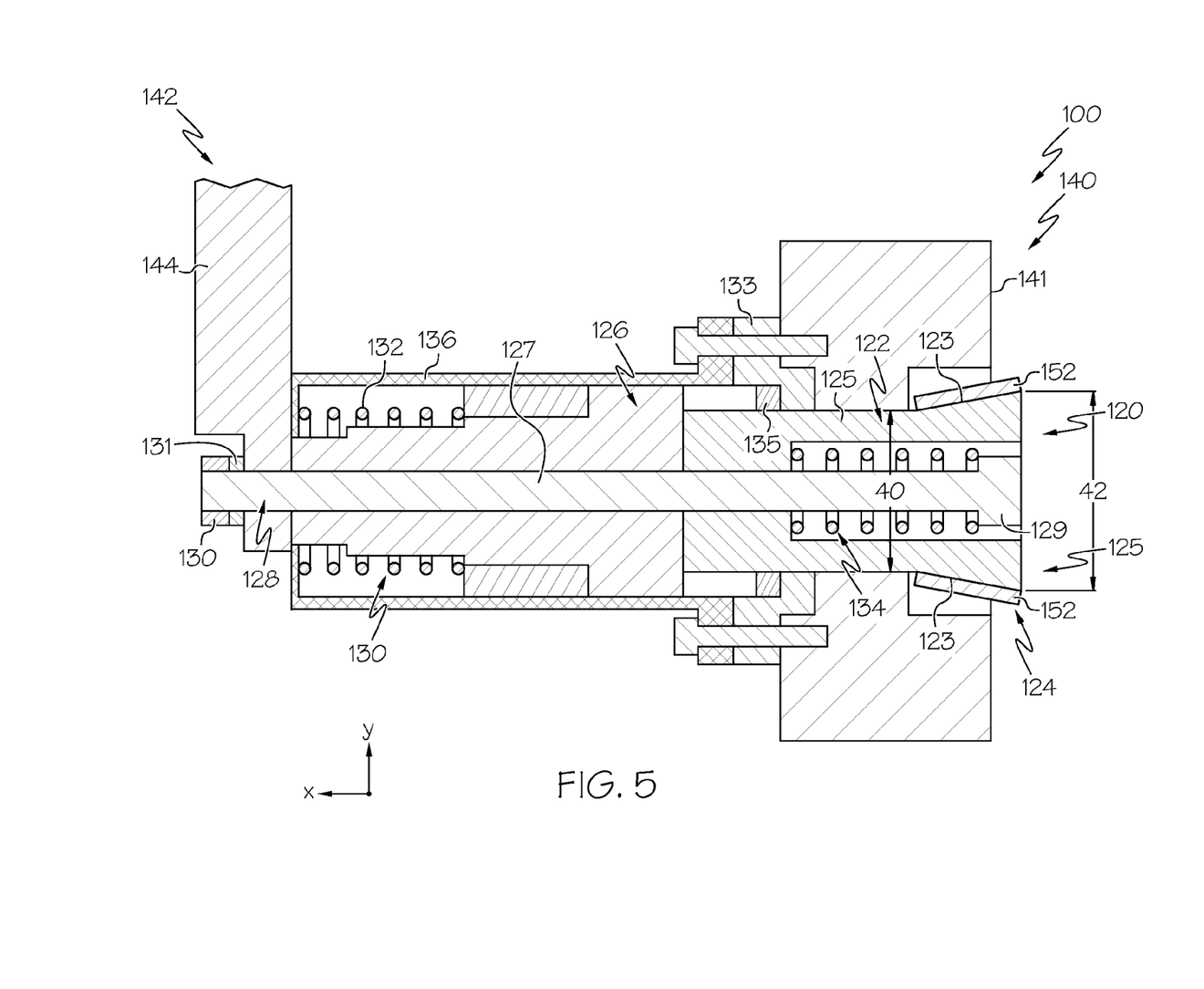
FIG. 5 schematically depicts an enlarged section view of an engagement assembly of the adapter assembly of FIG. 4 along section 5-5 according to one or more embodiments shown or described herein.
Figure 6:
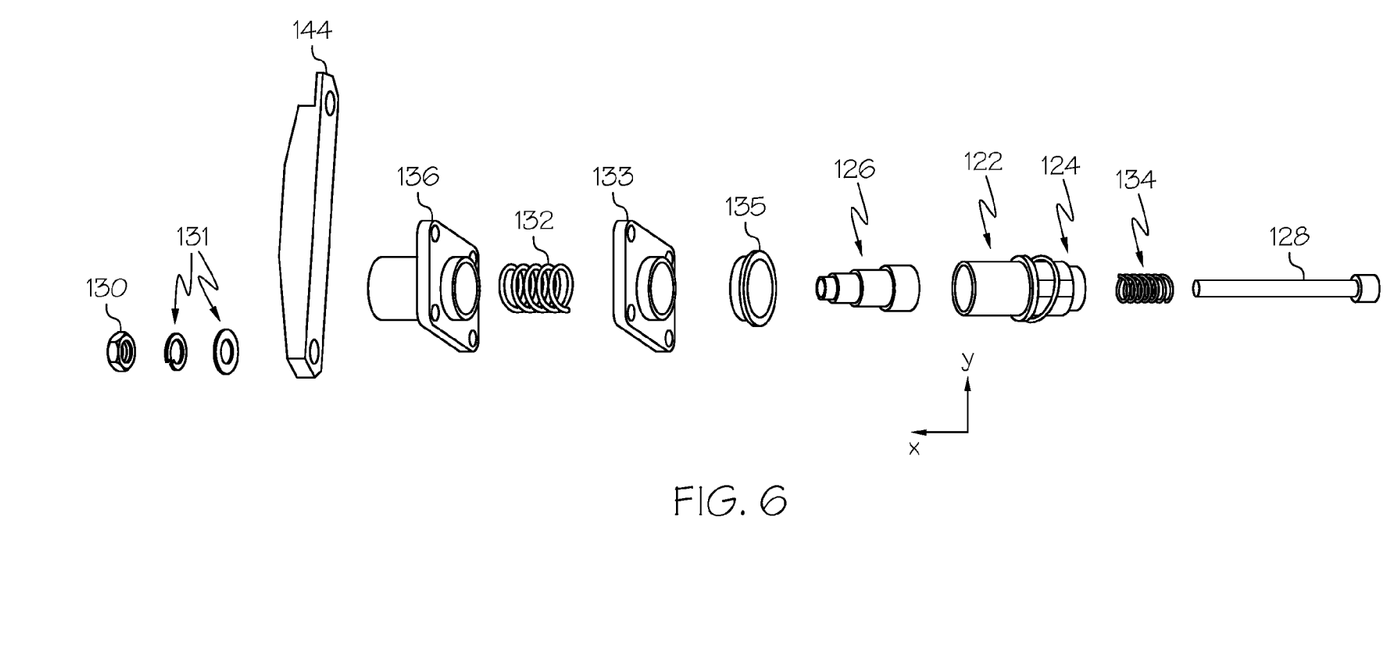
FIG. 6 schematically depicts an exploded view of the engagement assembly of FIG. 5 according to one or more embodiments shown or described herein.

Referring collectively to FIGS. 5 and 6, a cross-section of the adapter assembly 100 along section 5-5 of FIG. 4 and an exploded view of one of the engagement assemblies 120 are depicted, respectively. The engagement assembly 120 is positioned at least partially within the adapter plate 140 of the adapter assembly 100 and is positioned at least partially within a housing 136 that is coupled to the adapter plate 140. In embodiments, a guide 133 and/or a bushing 135 may be positioned between the housing 136 and the adapter plate 140 and may be coupled to the adapter plate 140.

The engagement assembly 120 may include a piston 126 that is positioned at least partially within the housing 136. The piston 126 is positioned rearward from the mandrel assembly 122 in the axial direction and contacts and engages the mandrel assembly 122. The piston 126 and the mandrel assembly 122 are movable with respect to the housing 136 in the axial direction such that mandrel assembly 122 and the piston 126 translate with respect to the housing 136 and the adapter plate 140 in the axial direction. In embodiments, the piston 126 is a separate component that is axially aligned with and engages the mandrel assembly 122. In other embodiments, the piston 126 is integral with and extends rearward from the mandrel assembly 122 in the axial direction.

The handle bar 144 is positioned rearward of the piston 126 in the axial direction and is coupled to the piston 126 and the mandrel assembly 122 by a through member 128. The through member 128 extends in the axial direction through the adapter assembly 100, extending through the mandrel assembly 122, the piston 126 and the handle bar 144 in the axial direction. The through member 128 includes a shaft portion 127 and a head portion 129, where a diameter of the head portion 129 is greater than a diameter of the shaft portion 127. In some embodiments, the through member 128 may include a threaded fastener, such as a bolt. The handle bar 144 is coupled to the through member 128 by mechanical fasters, such as a nut 130 and one or more washers 131.

A mandrel biasing member 134 is positioned between the head portion 129 of the through member 128 and at least a portion of the mandrel assembly 122 in the axial direction and biases the mandrel assembly 122 with respect to the head portion 129 in the axial direction. As the mandrel assembly 122 is engaged with the piston 126, the mandrel biasing member 134 biases the mandrel assembly 122 and the piston 126 with respect to the head portion 129 of the through member 128 in the axial direction.

The adapter assembly 100 includes a piston biasing member 132 that is positioned between the housing 136 and at least a portion of the piston 126 in the axial direction and biases the piston 126 in the axial direction with respect to the housing 136. As the piston 126 is engaged with the mandrel assembly 122, the piston biasing member 132 biases the piston 126 and the mandrel assembly 122 in the axial direction. Accordingly, the mandrel biasing member 134 and the piston biasing member 132 bias the mandrel assembly 122 and the piston 126 with respect to the housing 136 and the head portion 129 of the through member 128 in the axial direction. In embodiments, the piston biasing member 132 and the mandrel biasing member 134 include compression springs. In other embodiments, the piston biasing member 132 and the mandrel biasing member 134 may include torsion springs, tension springs, or the like.

Referring to FIG. 5, at least a portion of the mandrel assembly 122 and/or the expandable claw assembly 124 is positioned within the adapter plate 140 of the adapter assembly 100. As described above, the expandable claw assemblies 124 include one or more leaves 152 that extend outward from the engagement face 141 of the adapter assembly 100 in the axial direction and are positioned to engage the drive plate 12 (FIG. 2) of the engine 10. The expandable claw assemblies 124 are coupled to and/or engaged with the mandrel assembly 122. In the depicted embodiment, the mandrel assembly 122 and the expandable claw assembly 124 are generally circular in shape and the expandable claw assembly 124 extends around a circumference of the mandrel assembly 122. The mandrel assembly 122 is movable with respect to the expandable claw assembly 124 in the axial direction such that the mandrel assembly 122 may translate in the axial direction within the expandable claw assembly 124.

The mandrel assembly 122 includes a sloped region 123, in which the diameter of the mandrel assembly 122 increases along a length of the mandrel assembly 122 extending in the axial direction to an end 125 of the mandrel assembly 122 (i.e., in the −X-direction as depicted). For example, in the embodiment depicted in FIG. 5, the mandrel assembly 122 has a central diameter 40 at a central portion 121 of the mandrel assembly 122, and the diameter of the mandrel assembly 122 increases to an end diameter 42 at the end 125 of the mandrel assembly 122 along the length of the sloped region 123 in the axial direction, where the end diameter 42 is greater than the central diameter 40.

The sloped region 123 engages the expandable claw assemblies 124, and in particular the leaves 152 of the expandable claw assemblies 124 positioned around a circumference of the sloped region 123, such that when the mandrel assembly 122 translates relative to the expandable claw assemblies 124, the sloped region 123 changes the expandable claw assemblies 124 between the engaged position and the disengaged position. As described above, the sloped region 123 of the mandrel assembly 122 increases in diameter along a length of the sloped region 123 from the central portion 121 to the end 125 of the mandrel assembly 122. When the mandrel assembly 122, and accordingly the sloped region 123, move rearward in the axial direction with respect to the expandable claw assemblies 124 (i.e., in the +X-direction as depicted in FIG. 5), the portion of the sloped region 123 engaged with the expandable claw assembly 124 increases in diameter. As the portion of the sloped region 123 engaged with the expandable claw assembly 124 increases in diameter, the sloped region 123 of the mandrel assembly 122 drives the leaves 152 of the expandable claw assembly 124 apart, thereby increasing the diameter of the expandable claw assembly 124 and positioning the expandable claw assembly 124 in the engaged position.

Conversely, when the mandrel assembly 122, and accordingly the sloped region 123, moves forward in the axial direction with respect to the expandable claw assembly 124 (i.e., in the −X-direction as depicted in FIG. 5), the portion of the sloped region 123 engaged with the expandable claw assembly 124 decreases in diameter. As the portion of the sloped region 123 engaged with the expandable claw assembly 124 decreases in diameter, the sloped region 123 of the mandrel assembly 122 allows the leaves 152 of the expandable claw assembly 124 to move closer to one another, thereby allowing the diameter of the expandable claw assembly 124 to decrease, positioning the expandable claw assembly 124 in the disengaged position. In the disengaged position, at least a portion of the mandrel assembly 122 may extend outward from the expandable claw assembly 124 in the axial direction, as shown in FIG. 3.

Referring again to FIG. 5, to reposition the expandable claw assembly 124 between the disengaged position and the engaged position, the handle bar 144 is drawn rearward and away from the adapter plate 140 in the axial direction (i.e., in the +X-direction as depicted in FIG. 5), drawing the through member 128 rearward and away from the adapter plate 140 in the axial direction. By drawing the through member 128 away from the adapter plate 140, the head portion 129 of the through member 128 compresses the mandrel biasing member 134 in the axial direction, which causes the mandrel assembly 122, and accordingly the piston 126 to translate rearward in the axial direction with respect to the adapter plate 140 and the housing 136. As the piston 126 translates with respect to the housing 136, the piston 126 compresses the piston biasing member 132 against the housing 136 and the piston 126 and the mandrel assembly 122 translate rearward and away from the adapter plate 140 in the axial direction. As described above, when the mandrel assembly 122 translates rearward and away from the adapter plate 140 in the axial direction, the mandrel assembly 122 increases the diameter of the expandable claw assembly 124 and positions the expandable claw assembly 124 in the engaged position. In the engaged position, each of the expandable claw assemblies 124 have an engaged diameter that is the same or greater than an aperture diameter 20 of each of the apertures 14 of the drive plate 12. Accordingly, when the expandable claw assemblies 124 are positioned within the apertures 14 of the drive plate 12 and are in the engaged position, the expandable claw assemblies 124 contact and engage a circumference of the apertures 14, thereby severally coupling the adapter assembly 100 to the drive plate 12.

To reposition the expandable claw assembly 124 from the engaged position to the disengaged position, the handle bar 144 is released and/or moves forward and toward the adapter plate 140 in the axial direction (i.e., in the −X-direction as depicted in FIG. 5). The piston biasing member 132 biases the piston 126 and accordingly the mandrel assembly 122 forward and toward the adapter plate 140 in the axial direction, causing the mandrel assembly 122 to move forward with respect to the expandable claw assembly 124. As described above, when the mandrel assembly 122 moves forward and toward the adapter plate 140 in the axial direction, the mandrel assembly 122 positions the expandable claw assemblies 124 into the disengaged position. In the disengaged position, each of the expandable claw assemblies 124 have a disengaged diameter that is less than the engaged diameter and that is less than the aperture diameter 20 of each of the apertures 14 of the drive plate 12 such that the engagement assembles may pass through the apertures 14 of the drive plate 12. In this way, the expandable claw assemblies 124 may be freely removed from the adapter assembly 100 to the drive plate 12, and accordingly, the engine 10 (FIG. 1).

It should now be understood that adapter assemblies according to the present disclosure include an engagement assembly that includes a through member extending in the axial direction through the engagement assembly, and a mandrel assembly positioned at least partially within the adapter plate and extending in the axial direction. The engagement assembly further includes an expandable claw assembly engaged with the mandrel assembly, where the expandable claw assembly is repositionable between an engaged position, in which the expandable claw assembly has an engaged diameter, and a disengaged position, in which the expandable claw assembly has a disengaged diameter that is less than the engaged diameter. In embodiments, the through member may draw the mandrel assembly in the axial direction to reposition the expandable claw assembly between the engaged position and the disengaged position. As the through member extends through the engagement assembly in the axial direction, the through member may be easily removed from the engagement assembly, allowing removal and replacement of the components of the engagement assembly. By facilitating removal and replacement of components of the engagement assembly, the use of a through member that extends through the engagement assembly may reduce the amount of time required to repair an adapter assembly, reducing process downtime and manufacturing costs.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An adapter assembly for testing an engine, the adapter assembly comprising:
   an adapter plate comprising an engagement face;
   an engagement assembly positioned at least partially within the adapter plate, wherein at least a portion of the engagement assembly extends outward from the adapter plate in an axial direction, the engagement assembly comprising:
      a through member extending in the axial direction through the engagement assembly;
      a mandrel assembly positioned at least partially within the adapter plate and extending in the axial direction; and
      an expandable claw assembly engaged with the mandrel assembly, wherein the expandable claw assembly is repositionable between an engaged position, in which the expandable claw assembly has an engaged diameter, and a disengaged position, in which the expandable claw assembly has a disengaged diameter that is less than the engaged diameter.

2. The adapter assembly of claim 1, further comprising a housing coupled to the adapter plate.

3. The adapter assembly of claim 2, further comprising a piston positioned at least partially within the housing and engaged with the mandrel assembly.

4. The adapter assembly of claim 3, further comprising a piston biasing member positioned between the housing and at least a portion of the piston in the axial direction, wherein the piston biasing member biases the piston in the axial direction.

5. The adapter assembly of claim 1, further comprising a mandrel biasing member positioned between at least a portion of the through member and the mandrel assembly, wherein the mandrel biasing member biases the mandrel assembly in the axial direction.

6. The adapter assembly of claim 1, wherein the mandrel assembly comprises sloped region, in which a diameter of the mandrel assembly increases along a length of the mandrel assembly in the axial direction moving to an end of the mandrel assembly.

7. The adapter assembly of claim 1, wherein the expandable claw assembly comprises a plurality of leaves extending around a circumference of the mandrel assembly.

8. The adapter assembly of claim 7, wherein ones of the plurality of leaves define a gap positioned between the ones of the plurality of leaves.

9. An adapter assembly for testing an engine, the adapter assembly comprising:
   an adapter plate comprising an engagement face;
   a housing coupled to the adapter plate;
   an engagement assembly positioned at least partially within the adapter plate, wherein at least a portion of the engagement assembly extends outward from the adapter plate in an axial direction, the engagement assembly comprising:
      a through member extending in the axial direction through the engagement assembly;
      a mandrel assembly positioned at least partially within the adapter plate and extending in the axial direction;

an expandable claw assembly comprising a plurality of leaves engaged with the mandrel assembly; and
a handle bar coupled to the through member.

10. The adapter assembly of claim 9, wherein the mandrel assembly the mandrel assembly comprises sloped region in which a diameter of the mandrel assembly increases along a length of the mandrel assembly in the axial direction to an end of the mandrel assembly.

11. The adapter assembly of claim 10, wherein the plurality of leaves are engaged with and extend around a circumference of the sloped region of the mandrel assembly.

12. The adapter assembly of claim 9, further comprising a piston positioned at least partially within the housing and engaged with the mandrel assembly.

13. The adapter assembly of claim 12, further comprising a piston biasing member positioned between the housing and at least a portion of the piston in the axial direction, wherein the piston biasing member biases the piston in the axial direction.

14. The adapter assembly of claim 9, further comprising a mandrel biasing member positioned between at least a portion of the through member and the mandrel assembly, wherein the mandrel biasing member biases the mandrel assembly in the axial direction.

15. The adapter assembly of claim 9, further comprising a handle pivotally coupled to the adapter plate.

16. The adapter assembly of claim 15, wherein the handle bar is engaged with the handle and the handle selectively translates the handle bar in the axial direction.

17. A method for severally coupling an adapter assembly to an engine, the method comprising:
positioning the adapter assembly on a drive plate of the engine;
positioning at least a portion of an engagement assembly of the adapter assembly within an aperture of the drive plate of the engine;
drawing a through member that extends through the engagement assembly in an axial direction, thereby repositioning an expandable claw assembly from a disengaged position to an engaged position; and
engaging the aperture of the drive plate with the expandable claw assembly, thereby severally coupling the adapter assembly to the drive plate of the engine.

18. The method of claim 17, wherein drawing the through member of the adapter assembly in the axial direction draws a mandrel assembly in the axial direction to reposition the expandable claw assembly from the disengaged position to the engaged position.

19. The method of claim 17, wherein the expandable claw assembly has a disengaged diameter in the disengaged position and an engaged diameter in the engaged position, wherein the engaged diameter is greater than the disengaged diameter.

20. The method of claim 17, further comprising positioning at least a portion of a guide pin of the adapter assembly within a hole of the drive plate.

* * * * *

UNITED STATES PATENT AND TRADEMARK OFFICE
CERTIFICATE OF CORRECTION

| | | |
|---|---|---|
| PATENT NO. | : 9,638,605 B2 | Page 1 of 1 |
| APPLICATION NO. | : 14/813587 | |
| DATED | : May 2, 2017 | |
| INVENTOR(S) | : Larry Keith Stepp et al. | |

It is certified that error appears in the above-identified patent and that said Letters Patent is hereby corrected as shown below:

In the Claims

In Column 09, Delete Lines 4 to 8 and insert -- The adapter assembly of claim 9, wherein the mandrel assembly comprises a sloped region in which a diameter of the mandrel assembly increases along a length of the mandrel assembly in the axial direction to an end of the mandrel assembly. --.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*